United States Patent [19]

Harada et al.

[11] 4,076,700

[45] Feb. 28, 1978

[54] PROCESS FOR RECOVERING HIGH PURITY FATTY ACIDS AND/OR ROSIN ACID AND STEROLS

[75] Inventors: Tetsuya Harada, Tokyo; Tunemasa Yumoto, Chiba, both of Japan

[73] Assignee: Japan Synthetic Rubber Co., Ltd., Tokyo, Japan

[21] Appl. No.: 723,996

[22] Filed: Sep. 16, 1976

[30] Foreign Application Priority Data

Sep. 22, 1975 Japan .................................. 50-114492

[51] Int. Cl.² ................................................ C09F 8/07
[52] U.S. Cl. ..................................... 260/97.6; 203/72; 260/97.5; 260/98
[58] Field of Search ...................... 260/97.5, 97.6, 98; 203/72

[56] References Cited

U.S. PATENT DOCUMENTS

| | | | |
|---|---|---|---|
| 2,309,483 | 1/1943 | Turck, Jr. ............................. | 260/97.6 |
| 2,481,356 | 9/1949 | Segessemann et al. .............. | 260/97.6 |
| 2,894,880 | 7/1959 | Sisson et al. ......................... | 203/72 |
| 3,377,334 | 4/1968 | McBride et al. ..................... | 260/98 |
| 3,887,537 | 6/1975 | Harado et al. ....................... | 260/97.6 |

*Primary Examiner*—Eugene C. Rzucidlo
*Attorney, Agent, or Firm*—Oblon, Fisher, Spivak, McClelland & Maier

[57] ABSTRACT

A process for recovering fatty acids and/or rosin acid with a high purity which comprises first introducing a tall oil skimming soap or a tall oil soap into a thin film evaporator equipped with a rake in which the clearance between the blade tips and the surrounding evaporator wall is zero or not more than 1 mm, heating the same at a temperature higher than the melting point of the soap contained therein to evaporate and remove water and unsaponifiables, and then adding an alkali to the thus obtained crude soap to saponify the same, thereby decomposing the esters of rosin acid and fatty acids with sterols and other alcohols; or first saponifying a tall oil skimming soap or a tall oil soap with an alkali to decompose esters of rosin acid and fatty acids with sterols and other alcohols, and then introducing the thus obtained saponification product to the above-said thin film evaporator equipped with a rake, heating the same at a temperature higher than the melting point of the soap contained therein to evaporate and remove water and unsaponifiables; followed by subjecting the resultant saponification product to acid decomposition and distillation, thereby obtaining the desired fatty acids and/or rosin acid. In the above process, it is possible to recover not only the high purity fatty acids and/or rosin acid but also sterols by introducing, prior to the acid decomposition, the saponification product into the above-mentioned thin film evaporator equipped with a rake and then heating the same at a temperature higher than the melting point of the soap contained therein to evaporate and separate sterols and heavy unsaponifiable matters.

7 Claims, 3 Drawing Figures

PROCESS FOR RECOVERING HIGH PURITY FATTY ACIDS AND/OR ROSIN ACID AND STEROLS

This invention relates to a process for recovering rosin acid and/or fatty acids as well as sterols with a high purity from a tall oil skimming soap composed mainly of soaps of rosin acid and fatty acids which is obtained, for instance, from a black liquor produced in digesting kraft pulp.

The tall oil skimming soap contains a great quantity of water that accounts for about a half or more of the total amount of the soap. Although the substantial portion of the solids content is occupied by soaps of rosin and fatty acids, there are also contained, in fairly large quantities, neutral oils containing terpenes and other hydrocarbons, unsaponifiables such as sterols, and esters of alcohols such as sterols with rosin acid and/or fatty acids. According to the currently employed industrial methods for recovering rosin acid and fatty acids from a tall oil skimming soap, an inorganic acid such as sulfuric acid is added to the tall oil skimming soap to decompose the soaps contained therein and then the resulting mixture of free rosin acid and free fatty acids is separated and recovered. Since the thus recovered material (hereinafter referred to as tall oil) contains the aforementioned unsaponifiables and esters, said material is usually subjected to rectification under vacuum to fractionate the rosin acid and fatty acids. First, a fatty acid fraction containing water and unsaponifiables lighter than the fatty acids (said fraction being referred to hereinafter as head) is removed, and then a fraction composed mainly of esters, and unsaponifiables heavier than rosin acid and polymers (said fraction being hereinafter referred to as pitch) is eliminated. The residue is fractionated into rosin acid and crude fatty acids, thus obtaining the rosin acid as product. To attain a sufficiently high purity for industrial uses, the crude fatty acids are further subjected to rectification to remove the head comprising the faction of unsaponifiables containing much fatty acids, thereby obtaining high purity fatty acids.

When it is intended to obtain rosin acid and fatty acids with a sufficient purity for the industrial purpose from tall oil by distillation, it is necessary, as noted above, to remove unsaponifiables and esters from the tall oil. Because some unsaponifiables have boiling points very close to those of rosin acid and fatty acids, the head carries away therewith a substantial percentage of fatty acids, while the pitch carries away rosin acids mainly, resulting in substantial loss of such industrially valuable acids. Also, as the pitch contains esters of rosin acid and fatty acids with sterols and other alcohols in large amounts, development of an effective means for recovering the rosin acid and fatty acids contained in said pitch could greatly enhance the recovery of the industrially useful resources.

We have already proposed, in U.S. Pat. No. 3,887,537, a process for recovering high purity rosin acid and fatty acids from the head and pitch obtained as by-products in the tall oil distillation industry, which process comprises the steps of saponifying said head and/or pitch with an alkali solution to separate the unsaponifiables such as terpenes, sterols, etc., and soaps, introducing them into a thin film evaporator equipped with a rake, evaporating off the water- and sterol-containing unsaponifiables from the soaps in said evaporator, acid-decomposing the thus obtained soaps into fatty acids and rosin acid, further purifying them by distillation and recovering the high purity fatty acids and rosin acid in a high yield while also recovering the unsaponifiables such as sterols which are of high utility for industrial applications. The process of said U.S. patent can greatly increase the recovery of rosin acid and fatty acids in plants which are already equipped with the tall oil-fractionation means, whereas the present invention offers, in addition to the improvement in these existing means, a novel process for recovering rosin acid and fatty acids which is particularly useful in plants equipped with an additional tall oil skimming soap recovering means, a means for acid decomposition of a tall oil skimming soap into tall oil, and/or a tall oil distillation means in coordination.

The contents of rosin acid and fatty acids in the tall oil are usually indicated by their acid values. In manufacture of kraft pulp, if a needle-leaf tree, particularly pine tree, is used as a raw material, there can be obtained a high quality tall oil with a high acid value, but if a needle-leaf tree other than pine tree is used, or if a broadleaf tree is further added thereto, the resultant tall oil has a low acid value and is rich in pitch and head. In view of the economical operation of the existing tall oil distillation means, tall oils with an acid value of about 160 are usually treated in said distillation means, and it is considered that the lower limit of acid value of the tall oils treatable in said means is about 130. Distillation of tall oils with a lower acid value results in a large amount of pitch and head as by-products, whereby a reduction in recovery of rosin acid and fatty acids, a discoloration of the products, and deterioration of the product quality are often brought about.

Also, problems are involved in supply of a tall oil skimming soap to the mens for recovering tall oil by decomposition of a tall oil skimming soap with an inorganic acid such as sulfuric acid. There are not so many kraft pulp plants each of which can provide the minimum economical unit amount of a tall oil skimming soap material for said means, and hence it is generally attempted to supply the shortage by purchasing and transporting the tall oil skimming soap solutions from several other pulp plants. Further, in order to acquire the tall oil material in the quantity matching the minimum economical unit amount of tall oil skimming soap for the tall oil distillation means, it needs to purchase and transport the tall oil material from one or several plants for acid-decomposition of a tall oil skimming soap into tall oil. As about a half of the total amount of the tall oil skimming soap is occupied by water, a great extra transport cost corresponding to the amount of water is necessitated, and further, owing to the high viscosity of the soap solution, the warming of the solution is required in transport or treatment. Also, as it is corrosive at high temperatures, containers and pipings made of a specific (non-corrosic) material are required. Moreover, a great amount of utility is required and much waste water is produced in recovery of tall oil by acid decomposition of the tall oil skimming soap, and the cost for establishing the apparatus is high owing to the corrosive action of the material.

It is an object of this invention to provide a process for recovering rosin acid and/or fatty acids with a high purity from a tall oil skimming soap.

It is another object of this invention to provide a process for recovering not only rosin acid and/or fatty acids with a high purity but also sterols from the tall oil skimming soap.

It is still another object of this invention to provide a process for recovering not only rosin acid and/or fatty acids with a high purity but also sterols from the tall oil skimming soap, which can be incorporated in the black liquor recovery step in kraft pulp plants.

It is a still further object of this invention to provide a process for recoverying rosin acid and/or fatty acids, by which the tall oil skimming soap can be supplied in the form of a powder directly to the tall oil purification facilities.

The other objects and advantages of this invention will become apparent from the following description.

According to the present invention, there is provided a process for recovering high purity fatty acids and/or high purity rosin acid, or these acids and sterols, characterized in that a tall oil skimming soap or a tall oil soap is first introduced into a thin film evaporator equipped with a rake in which the clearance between the blade tips and the surrounding evaporator wall is zero or not more than 1 mm and heated therein at a temperature higher than the melting point of the soap contained therein to evaporate and remove water and low boiling unsaponifiables, and an alkali is subsequently added to the thus obtained crude soap to saponify the soap, thereby decomposing esters of rosin acid and fatty acids with sterols and other alcohols; or alternatively, a tall oil skimming soap or a tall oil soap is first saponified with an alkali to decompose esters of rosin acid and fatty acid with sterols and other alcohols, and the thus obtained saponification product is subsequently introduced into the said thin film evaporator and heated therein at a temperature higher than the melting point of the soap contained in said product to evaporate and remove water and low boiling unsaponifiables; and the thus obtained saponification product is, if necessary, introduced again into said thin film evaporator and heated therein at a temperature higher than the melting point of the soap contained in the product to evaporate and separate sterols and heavy unsaponifiables, and the thus obtained saponification product is then subjected to acid decomposition and distillation.

Although the process of this invention may be incorporated into a series of steps of recovery of a tall oil skimming soap solution, recovery of tall oil and distillation in the conventional process, it is also possible to incorporate a part of the facilities used in the process of this invention into the black liquor recovery step in the kraft pulp plants to withdraw the tall oil skimming soap in the form of a powder or paste with substantially no water content. This allows a sizable reduction of the transport cost, and because of no corrosive action, the powdery of pasty tall oil skimming soap can be treated as easily as in the case of ordinary soap powder. This can also save waste resulting from the necessity of conducting the three steps, namely recovery of a tall oil skimming soap solution, recovery of a tall oil and distillation, at different locations and transporting the products from the respective locations. According to the process of this invention, the tall oil skimming soap powder produced in a pulp plant is directly transported to the tall oil purifying facilities, or the high purity rosi acid and fatty acids manufacturing falilities, allowing the curtailment of the transport cost, a much easier treatment, and a sizable reduction of equipment cost. This invention also renders it possible to recover rosin acid, fatty acids and sterols from the head and pitch, which contain the rosin acid, the fatty acids and esters of these acids with the sterols and other alcohols, though these have hitherto been wasted. This provides a marked improvment of the recovery of rosin acid and fatty acids and permits obtainment of the high quality products which are substantially free of the problems of discoloration and other conventional handicaps. Thus, the prominent effect of this invention is that it enables an economical treatment of the low-grade tall oils with an acid value of less than 130, which treatment has been hardly possible with the conventional tall oil distillation equipment for the economical reason. It is also made possible to make the best use of the tall oil resources which have not been utilized effectively on economical terms due to the locations of pulp plants remote from the tall oil recovery plants or tall oil distilleries.

In the ordinary tall oil distillation step, a large number of stages are required for separation of rosin and/or fatty acids and also a high reflux rate is necessitated owing to the presence of ester and unsaponifiables which are contained in the tall oil stock and hard to separate from the rosin acid and/or fatty acids. Therefore, there are required the large-sized distillation towers with a large number of stages and a large caliber, and the amount of the necessary utility is also high. According to the process of this invention, esters and unsaponifiables which are hard to separate from the rosin acid and/or fatty acids by distillation are removed from rosin acid and fatty acid soaps by initial evaporation or by evaporation after saponification, prior to the introduction into the distillation step, so that it is possible to obtain high purity products by using a distillation step which is smaller in the number of stages and lower in reflux rate than required in the conventional processes. Accordingly, the amount of the necessary utility is lessened and also the caliber of the distillation towers can be reduced, and in some cases, it is even possible to reduce the number of distillation towers required for the process. Thus, if the existing tall oil distillation facilities are incorporated in the process of this invention, the throughput capacity of the distillation facilities is greatly enhanced, and it is also rendered possible to recover the rosin acid and fatty acids bonded to esters, resulting in markedly improved economy in the recovering process.

The process of this invention aims at recovering resin acid and/or fatty acids with a high purity from the tall oil skimming soap solutions, and hence it needs to obtain the soaps with higher purity than the tall oil skimming soap. The soaps existing in the tall oil skimming soap solutions comprise rosin acid soaps and fatty acid soaps composed chiefly or highly unsaturated oleic acid, linolic acid and linolenic acid, and these soaps are thermally very unstable. In order to improve the purity of these soaps, it is necessary to remove even the high-boiling matter and, therefore, to use high temperatures. This involves rather excessive decomposition and discoloration of the products due to the long holding time at elevated temperatures, as is usually the case with ordinary distillation or evaporation. For this reason, in the present invention, a thin film evaporator is employed instead of resorting to the conventional means of distillation or evaporation. According to this evaporator, the material flowing along tube walls in the vessel can be spread to thin films and rapidly evaporated by heating the tube walls, so that it is possible to minimize the decomposition of the thermally unstable matter and to recover high purity fatty acid and rosin acid soaps.

This thin film evaporator equipped with a rake has a clearance, ranging from substantially zero to about three millimeters, between the blade tips in the vessel and the surrounding wall, the choice of such clearance depending on the intended use of the evaporator.

The tall oil skimming soap solutions being treated in the process of this invention or the soaps obtained after saponification contain low-boiling unsaponifiables and a large amount of water. Since the evaporation temperature of these unsaponifiables is considerably lower than the melting temperature of the soaps, the temperatures at the inlet and in the vicinity of the upper portion of the rake-provided thin film evaporator are necessarily so low during operation that the soaps in these parts will not melt and not flow down gravitationally. Therefore, if a rake type thin film evaporator having a larger clearance is used for the treatment, the soaps will not melt and will deposit on the heating surfaces. Thus only partly dehydrated, they will form thin films with an increased viscosity and will scarcely flow down, making it impossible for the evaporator to carry out its normal function. In addition, the evaporator with a large clearance cannot achieve the purpose of reducing the material's contact time with the heating surfaces to a minimum, an important requirement for the successful evaporation of the thermally unstable material which has to be treated above the melting temperature of the soaps.

On the other hand, the thin film evaporator having a very narrow clearance or equipped with a blade in contact with the surrounding wall is capable of forcing down or scraping off the soapy deposits not yet heated to the melting point from the heating surfaces (tube walls) by means of the blade. In this way, the soaps are fluidized and melted by thorough heat transfer with a uniformly shortened period of time for contact with the entire heating surfaces. The deposits thus melt down while decomposing the unsaponifiables contained in the soaps. It then follows that the purpose of the invention is accomplished by the use of a rake type thin film evaporator in which the clearance between the blade tips and the tube wall is narrow or the blade is in contact with the wall. The clearance between the blade tips and the tube wall is desirably not greater than 1 mm, most preferably not greater than 0.5 mm. It is to be noted however that the clearance specified above is not essential after the temperature of the tall oil skimming soap has reached a level higher than the melting point of the soap contained therein because, under such conditions, the tall oil skimming soap is liquefied and flows down naturally. The blade for the evaporator may be any of the known types, such as the rigid type, the wiper type with a flexible shaft and blade, or the type having a flexible blade alone, provided that it gives a clearance of not greater than 1 mm.

Generally, there are employed two types of thin film evaporators for the industrial applications: a horizontal type and a vertical type. According to the process of this invention, once the soaps reach the melting point, the melt flows down naturally as its viscosity is relatively low, or it may be carried down forcedly. However, in the stage where water in the soap has been evaporated before reaching the melting point, the deposits must be scraped off by the rake with the clearance of less than 1 mm, and also the temperature must be quickly elevated to the flow-point. Therefore, it is advantageous for the purpose of this invention to use a vertical type evaporator which is capable of fluidizing the deposits with the aid of gravitation. It is however possible to employ a horizontal type evaporator, too.

Now the process of this invention is described in further detail referring to some preferred embodiments thereof while having reference to the accompanying drawings, in which.

Figure 1:
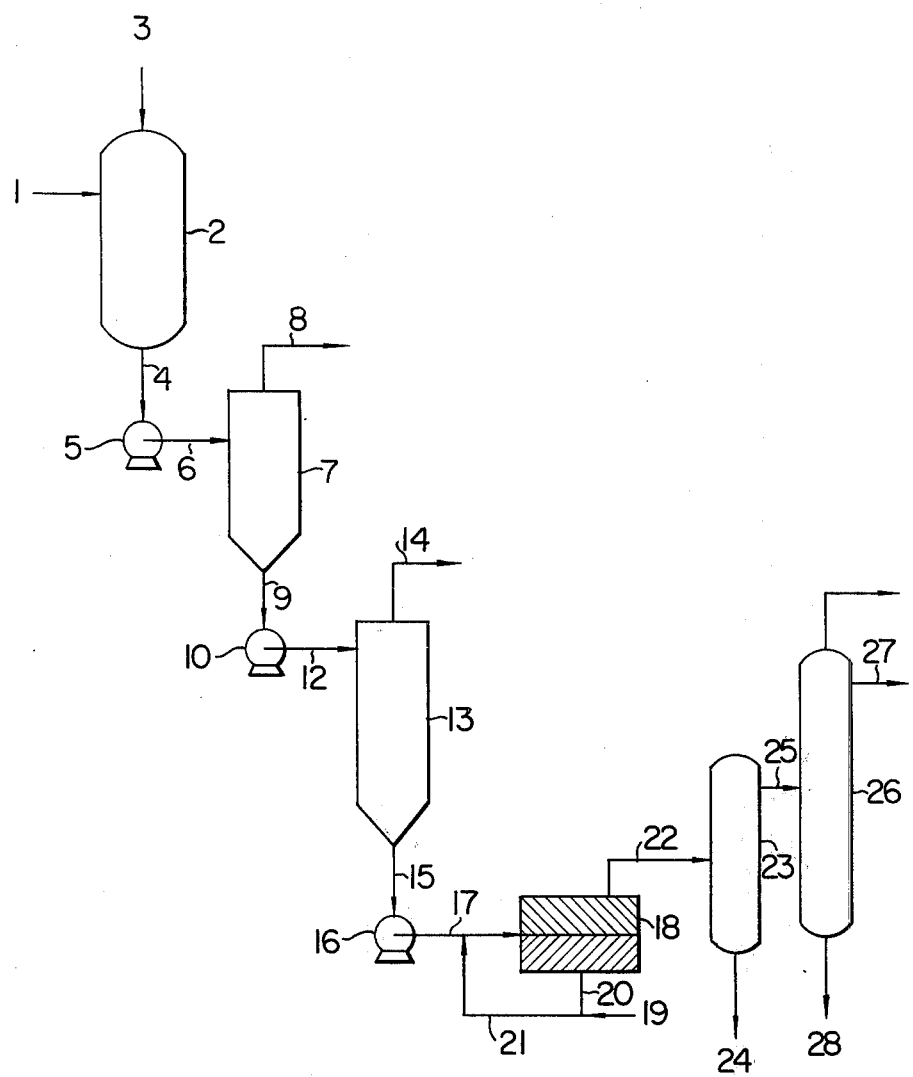
FIG. 1 is a flow sheet of the process according to the present invention as used for recovering high purity fatty acids, rosin acid and sterols from the tall oil skimming soap.

Referring first to FIG. 1, there is shown, in a flow sheet, a preferred embodiment of the process of this invention. There is first collected the tall oil skimming soap which has floated up in the surface of the black liquor released from a kraft pulp plant and having the pulp separated therefrom after digesting, and/or the concentrated black liquor withdrawn from an intermediate stage in the black liquor concentration step. The collected tall oil skimming soap is introduced into a saponifier 2 through line 1, and then added thereto through line 3 is an alkali solution in an amount equal to the saponification equivalent of said tall oil skimming soap material or to an excess of 20%. Where saponification is hard to take place, an alkyl alcohol with a carbon number of 1 to 8 is further added, and the mixture is forcibly agitated at between room temperature and 250° C, preferably between 80° and 200° C, so as not to induce decomposition of the useful components, and under a pressure higher than the atmospheric, preferably between the atmospheric and the gage pressure of 15 kg/cm², for a period of several minutes to several hours to effect saponification until the esters are completely decomposed.

The saponified tall oil skimming soap is fed via line 4 and line 6, by the operation of a pump 5, into a rake-installed thin film evaporator 7 having a clearance of less than 1 mm between the blade tips and the tube wall. In the evaporator the charge is treated under the lowest possible pressure, preferably between 50 mmHg and 10 mmHg, and at a temperature higher than the melting point of the soaps containing the heavy unsaponifiables, preferably between the melting point and the melting point plus 50° C, thereby removing light unsaponifiable matters and water. In case a solvent such as an alcohol is added during saponification, such solvent is also removed along with water and light unsaponifiables. Although not shown in the drawings, the solvent such as alcohol and the unsaponifiables containing terpenes are further separated and recovered from the removed substances.

The molten soaps are withdrawn through line 9 and guided into a rake-attached thin film evaporator 13 of the second stage through line 12 by using a pump 10 if such is needed. Here, the heavy unsaponifiable matters which are left unremoved in the first stage evaporator are removed and discharged out through line 14.

In order to recover the unsaponifiables containing $\beta$-sitosterol at a relatively high concentration, the charge is treated under the temperature and pressure conditions necessary for evaporating such $\beta$-sitosterol, that is, under a reduced pressure lower than used in the first stage evaporator, preferably less than 5 mmHg, and at a temperature higher than the melting point of the soaps, preferably between the melting point and 320° C, whereby industrially useful heavy unsaponifiable matters containing β-sitosterol at a high concentration are recovered through line 14, while molten soaps are obtained from line 15.

Where recovery of β-sitosterol is not required for the industrial purpose, the second stage treatment in the process of FIG. 1 is usually omitted, but this treatment may be carried out under a pressure equal to or lower than that required for removal of the pitch in the succeeding distillation operation, and at a temperature equal to or higher than that required for said operation.

In either case, the obtained soaps are introduced into an acid decomposer 18 via line 17 and subjected therein to acid decomposition by a known method. Then a fresh supply of an inorganic acid such as sulfuric acid is given via line 19, and after mixed with the circulating inorganic acid solution, it is contacted with the soaps to effect acid decomposition. The obtained mixture of rosin acid and fatty acids is taken out through line 22 and charged into a distillation equipment 23. In this distillation equipment (or evaporator) 23, the oxy-acids and other heavy components which are largely responsible for the coloration of the products are separated from the mixture and discharged out from line 24, while the mixture of high purity rosin acid and fatty acids is extracted from line 25 and guided into another distillation equipment 26, where the mixture is separated into high purity rosin acid and high purity fatty acids, the former being recovered from line 28 and the latter from line 27.

According to the process of this invention, as compared with the conventional form of tall oil distillation, the light and/or heavy unsaponifiables are already removed when the material is still in the form of soaps, so that the light and heavy unsaponifiable matters produced in a small quantity as a result of decomposition or polymerization of the useful components in the thin film evaporators are substantially removed away with the head and pitch. Therefore, separation and recovery of the industrially useful rosin acid and fatty acids can be accomplished with ease by use of the small-sized distillation equipment with a relatively small number of stages.

In case it is industrially not advantageous to practice the process of this invention with the supply of a tall oil skimming soap from a single kraft pulp plant, a part of the process of the invention may be performed at another distant pulp plant or plants to obtain soap powder, and the soaps obtained from these plants may be joined together and treated. In such a case, only the treatments by the saponifier 2 and the first stage evaporator 7 in each pulp plant may be sufficient for attaining the end of the invention. The molten soaps taken out of the first stage evaporation may be readily solidified or powdered by cooling, so that their handling and transport are very easy.

Since about a half of the total amount of tall oil skimming soap recovered in the pulp plant is occupied by water, measures are desirably taken for reducing the consumption of heat required for removal of water in the first stage evaporator 7 or for making best use of such heat. To this end, it is suggested to utilize the volume of heat possessed by the tower top steam in the evaporator for heat exchange with the tall oil skimming soap material, or for heat exchange with the black liquor supplied into the black liquor concentrator in the pulp plant, or as a part of the heat source for black liquor concentration. This leads to saving of energy required for the operation and reduction of the treatment cost.

In practicing the process of this invention, it is not always advantageous to provide both saponifier and first stage evaporator in each pulp plant, particularly when it needs to collect the tall oil skimming soap from many pulp plants in a single acid decomposition and distillation equipment, or when the tall oil skimming soap production in each pulp plant is low. In order words, there are the cases where it proves more advantageous to provide the first stage evaporator in each pulp plant and, after powdering the unsaponified tall oil skimming soaps and collecting them at one location, subject them to a saponification treatment. A method such as represented by a flow sheet in FIG. 2 proves useful in such a case. In this case, the tall oil skimming soap obtained in the respective pulp plants are collected and supplied into the first stage evaporator 2 via line 1. Used for this first stage evaporator is a thin film evaporator equipped with a rake and having a clearance of less than 1 mm between the blade tips and the tube wall, and the charge is treated under the lowest possible pressure, preferably between 50 and 10 mmHg, and at a temperature higher than the melting point of the soaps containing the heavy unsaponifiables, preferably between the melting point and the melting point plus 50° C. The light unsaponifiables and water are thereby removed while the molten soaps are guided into a receiver 6 through line 5 and cooled and powdered therein. The powdered soaps are collected at one location from the respective pulp plants and fed into a saponifier 10 through line 8.

Then added thereto is an aqueous alkali solution in an amount equal to the saponification equivalent of the soaps supplied through line 9 or to an excess of up to 20%, preferably a 20 to 50% aqueous solution of sodium hydroxide, and in case saponification is still hard to progress, an alkyl alcohol with 1 to 8 carbon atoms is further added, and the mixture is subjected to forced agitation at a temperature between room temperature and 250° C not high enough to induce decomposition of the useful components, preferably between 80° and 200° C, and under a pressure higher than the atmospheric, preferably between the atmospheric and a gage pressure of 15 kg/cm$^2$, for a period of several minutes to several hours until saponification is accomplished to a sufficient degree to effect perfect decomposition of esters. The saponified soap solution is guided through line 11 and line 13, by means of a pump 12, into a rake-attached thin film evaporator 14 having a clearance of not greater than 1 mm between the blade tips and the tube wall, where water and light unsaponifiables, as well as alcohol when it is used as solvent, are removed. The molten soaps are introduced through line 16, pump 17 and line 18 into another rake-equipped thin film evaporator 19 where the charge is treated under the temperature and pressure conditions necessary for removing at least β-sitosterol to recover the heavy unsaponifiables containing 62-sitosterol at a high concentration, while the molten soaps are withdrawn through line 21. These soaps are then supplied through pump 22 and line 23 into an acid decomposer 24 where they are subjected to acid decomposition by a known method, and the mixture of rosin acid and fatty acids is taken out of the decomposer 24 through line 25. An inorganic acid required for acid decomposition, preferably sulfuric acid, is supplied from line 32. The acid mixture is further brought into a distillation device 26 from which the pitch containing the heavy components is discharged out through line 28, while rosin acid and fatty acids are further led into another distillation unit 29 whereby the high purity rosin acid is recovered from line 31 and the high purity fatty acids from line 30.

Figure 2:
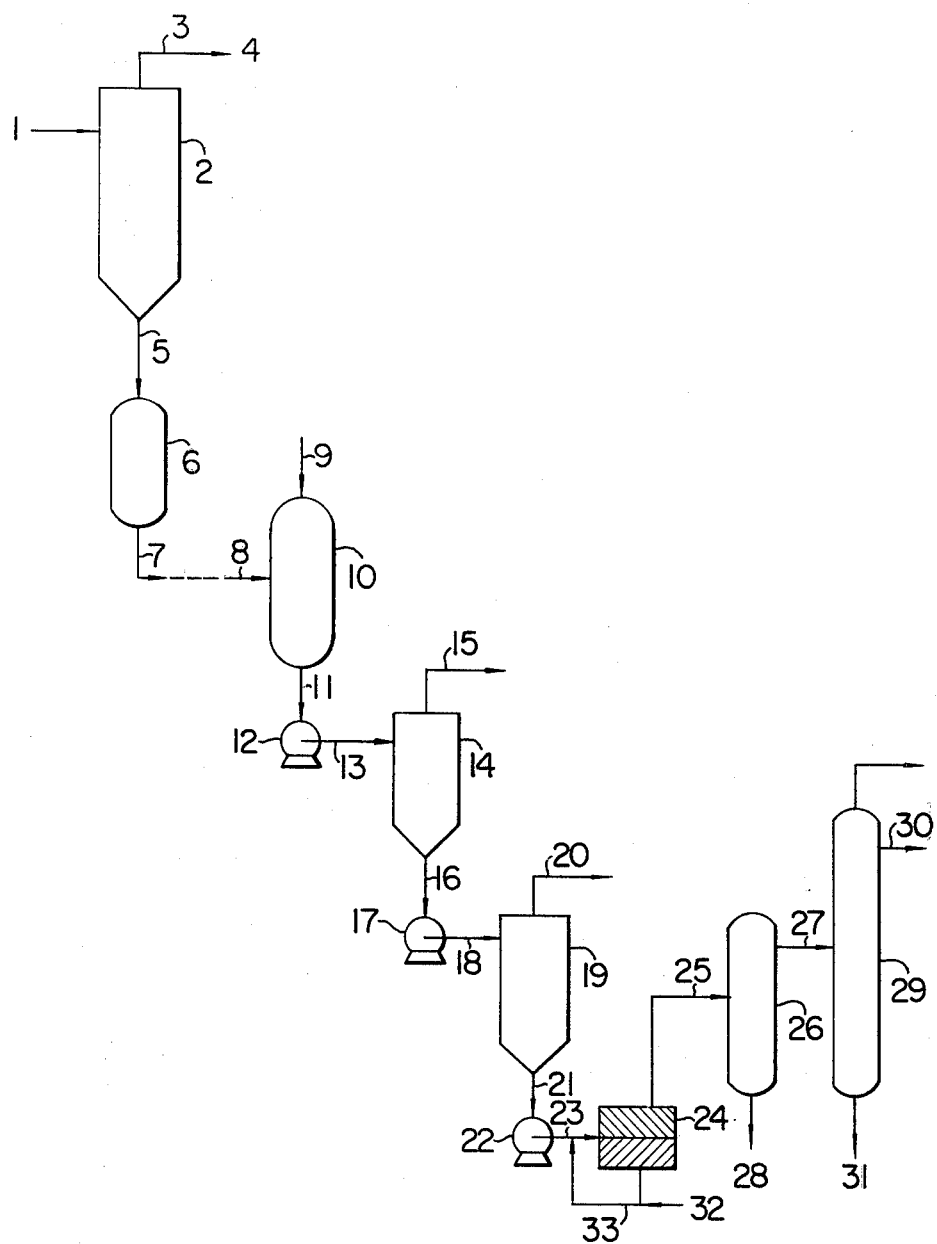
FIG. 2 is a flow sheet of the process wherein the non-saponified tall oil skimming soap is powdered, collected and subjected to a saponification treatment at one location.
Figure 3:
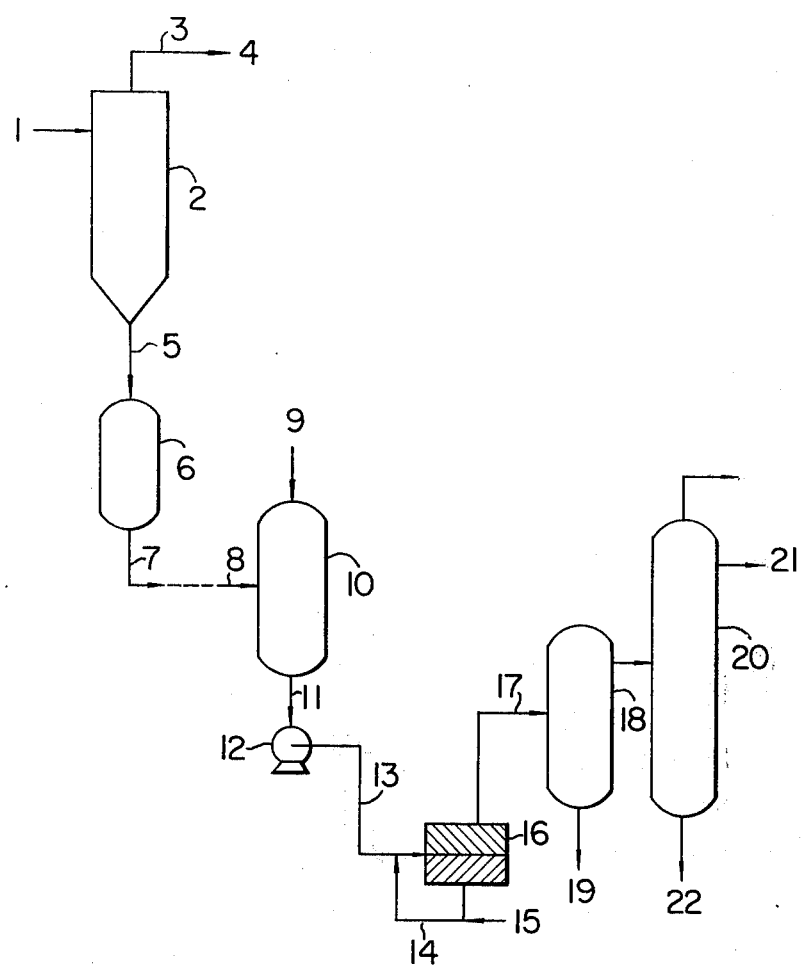
FIG. 3 is a flow sheet of the process of FIG. 2 wherein recovery of the heavy unsaponifiables such as $\beta$-sitosterol is not required.

In the case where recovery of β-sitosterol and other heavy unsaponifiables is not required, a rake-attached thin film evaporator 2 having a clearance of not greater than 1 mm between the blade tips and the tube wall is provided in each pulp plant and, as shown in FIG. 3, soap powder cleared of water and terpene-containing light unsaponifiables is prepared in the receiver 6, and such soap powder is collected in one location and supplied into a saponifier 10 for accomplishing saponification in the same way as the process of FIG. 2. After saponification, the resultant aqueous soap solution is immediately introduced into an acid decomposer 16. There is obtained a mixture of rosi acid, fatty acids and heavy unsaponifiables containing sitosterol, and this mixture is guided through line 17 into a distillation apparatus or evaporator 18. Here, the pitch composed mainly of sitosterol-containing heavy unsaponifiables is removed from line 19 and the remainder is further led into a fractionating apparatus 20 where the high purity rosin acid is recovered from line 22 while the high purity fatty acids from line 21.

According to this system, it is possible to easily obtain the high purity fatty acids from the fractionating apparatus because the light unsaponifiables which are hard to separate from the fatty acids are removed from the soap mixture in the first thin film evaporator. The heavy unsaponifiables containing sitosterol are removed in the form of pitch, so that when it is desired to separate sitosterol from a part of the pitch, the pitch discharged out through line 19 is loaded into an evaporator, preferably a rake-incorporated thin film evaporator, not shown, and treated under the pressure and temperature conditions suited for causing evaporation of β-sitosterol, that is, under a reduced pressure, preferably less than 5 mmHg, and at a temperature of not higher than 320° C, thereby recovering the fraction containing β-sitosterol at a high concentration.

In the distillation apparatus or evaporator 18, although a part of rosin acid is carried away as a pitch component and lost, such rosin acid is recovered together with sitosterol. When it is desired to obtain sitosterol with a small rosin acid content, such pitch component must be further treated in the second stage thin film evaporator. That is, the material is first treated in the first stage evaporator under the pressure and temperature conditions capable of removing rosin acid so as to separate the rosin acid, and then the pitch component is introduced into the second stage evaporator and treated under the pressure and temperature conditions allowing recovery of β-sitosterol, preferably under a pressure lower than 5 mmHg and at a temperature lower than 320° C. High purity sitosterol can be recovered thereby.

As an extra effect of this invention, it is possible according to this invention to obtain dry soaps from the tall oil skimming soap and to obtain rosin acid and fatty acids by transforming dry soaps into tall oil by using sulfuric acid and distilling the same. It was revealed that disproportionation of rosin acid and isomerization of fatty acids can be accomplished in line with the process of this invention by subjecting the tall oil skimming soap to the hereinbelow described treatments and drying, instead of resorting to the conventional method in which the disproportionation and isomerization treatments are conducted on the rosin acid and fatty acids respectively after separation. This derived from the findings that the rosin acid obtained by changing dry soaps into tall oil with sulfuric acid and distilling the same can be used immediately as disproportionated rosin acid while the obtained fatty acids can be used readily as isomerized fatty acids, and the color shade or hue of the respective acids is also improved. This fact is of much industrial significance, particularly in that the process requires no step for disproportionation of rosin acid, or isomerization of fatty acids, apart from the already mentioned merits of the present invention.

It is known in the art to obtain disproportionated rosin acid by a high temperature treatment in the presence of an activated carbon-supported palladium catalyst, iodine, nickel salts, selenium or sulfur, but there is known to date no techniques for disproportionation of rosin acid in the form of a sodium soap such as tall oil skimming soap. It is reported in British Patent Nos. 1,251,927 and 1,129,546 and U.S. Pat. No. 3,377,334 that the thiobis type antioxidant of alkylphenol is effective for disproportionation of rosin acid, but no mention is made of disproportionation in the form of a rosin soap.

The potassium salts of disproportionated rosin acid play an important role as an emulsifier in manufacture of synthetic rubbers, but in the conventional processes, disproportionation has been performed in the disproportionation step in the presence of a catalyst after refining and separation of rosin acid such as gum rosin, wood rosin or tall oil rosin, and no attempt has ever been made for disproportionation of rosin acid contained in the form of a rosin soap such as tall oil skimming soap.

Since the tall oil distillation includes a treating step at a high temperature, the obtained rosin acid is often colored due to heat deterioration, but the disproportionated rosin acid not containing the thermally unstable "abietic acid type" are more stable thermally. In practicing distillation of tall oil obtained from a disproportionating reaction performed by adding a disproportionating catalyst to a tall oil skimming soap in the process of this invention, the disproportionated material is stable to high temperature during distillation, and hence it is possible to obtain disproportionated rosin acid with a good tint with ease by distillation.

Although an alkylphenol type thiobis anti-oxidant was used as the disproportionating catalyst in the embodiments of this invention, such a substance is merely a typical example of the catalyst usable for the purpose of this invention. An important reason for addition of the anti-oxidizing agent is to prevent polymerization induced by the "oxy-acids" in the tall oil skimming soap. As the operation of removing the disproportionating catalyst is hard to apply in the case of tall oil skimming soap unlike the case of rosin acid, it is desirable to select such a type of catalyst which, even if left over after disproportionation, will give no impediment to the succeeding treatments.

In the process of this invention, such a disproportionating catalyst is added to the tall oil skimming soap in the form as obtained or after dissolving it in a solvent, and retained at a temperature higher than 150° C, preferably between 180° C and 200° C, under agitation. In this case, if the alkali is present in excess, saponification of esters takes place simultaneously. Heating time is usually 20 minutes to 1 hour. The disproportionated tall oil skimming soap is dried, turned into tall oil by means of sulfuric acid and then distilled according to the process of this invention. The thus obtained rosin acid contains little abietic acid, and therefore it is useful as disproportionated rosin acid and has a good hue.

The fatty acids in tall oil contain oleic acid, linolic acid, linolenic acid and the like, and usually, the acids with more than two double bonds, if not treated specifically, are mostly of the non-conjugated double bond type. However, the isomerized fatty acids having many conjugated double bonds are suited for use in coating paint or ink.

Known as means for isomerization of fatty acids are a method using an alkali and a method employing a catalyst such as pentacarbonyliron. Any of these methods can be applied to the separated and refined fatty acids, but in the process of this invention, since the tall oil skimming soap is used in the form of an alkali soap and an excess of an alkali is added for saponification of esters, the isomerized fatty acids containing many conjugated double bonds can be obtained easily from the fatty acids provided through tall oil conversion and distillation after the alkali treatment of the tall oil skimming soap with no need of making any specific treatment but by merely controlling the reaction temperature, the degree of excess of alkali added and the reaction time necessary for the isomerization of fatty acids, and it was also confirmed that the products have a good color shade.

As saponification and isomerization are accomplished simultaneously in the process of this invention, it is desirable to add an alkali in an excess of 1.2 to 3.5 times. If it is added in an excess of more than 3.5 times, the alkali is precipitated on the wall surface of the thin film evaporator to retard flow-down of soaps, while if the excess is less than 1.2 times, the progress of the isomerization reaction slows down excessively. The reaction temperature is selected between 120° and 210° C, preferably between 180° and 190° C, and the reaction time is usually between 20 minutes and 3 hours, preferably between 30 minutes and 1 hour.

EXAMPLE 1 AND REFERENTIAL EXAMPLE 1

To 10 kg of the tall oil skimming soap obtained from a kraft pulp plant was added at room temperature an excess of a 5% sulfuric acid solution, and the oily portion floating up on the liquid surface was separated. The liquid portion was further extracted three times with diethyl ether, and the ether extract was joined with the initially separated oily portion. After fractionating the ether, there was obtained 5.64 kg of a dark-brownish oily substance (tall oil).

This tall oil had a total acid value of 125 and a saponification value of 144.6 and contained 31.2% of rosin acid, 2.5% of oxy-acids and 25.3% of unsaponifiables.

To 20 kg of this tall oil skimming soap was added 4.6 kg of a 5% sodium hydroxide solution, and the mixture was saponified in a 50-liter autoclave equipped with an agitator at a temperature of 185° C and a pressure of 10.5 kg/cm$^2$ for 50 minutes. The saponified mixture was then charged into a thin film evaporator having a heat transfer surface area of 0.1 m$^2$ and no clearance between the blade tips and tube wall and treated at a flow rate of 18 kg/hr with a blade speed of 1,000 r.p.m. under the conditions of 230° C and 17 mmHg. As a result, water and light unsaponifiable matters were recovered from the top of the evaporator, and after separating water, there was obtained a brownish oil substance having a terpene-like smell in a yield calculated on the basis of tall oil of 6.2%.

The soaps discharged from the bottom of the vessel were transferred into a thin film evaporator equipped with a rake and having a heat transfer surface area of 0.1 m$^2$ and a clearance of 0.8 mm between the blade tips and tube wall, and treated at a flow rate of 15 kg/hr with a blade speed of 1,000 r.p.m. under the conditions of 310° C and 1.4 mmHg. The treatment gave from top of the evaporator an oily substance containing $\beta$-sitosterol in a yield calculated on the basis of tall oil of 14.4%.

The molten soaps obtained from the bottom of the evaporator were poured into a 5% aqueous solution of sulfuric acid at 80° C and the mixture was subjected to phase separation and centrifugal separation, producing an oily product in a yield calculated on the basis of tall oil of 78.8%. This oily product was further fed into two connected rake-equipped thin film evaporators having a heat transfer area of 0.1 m$^2$ and a clearance of 0.8 mm, with the first evaporator being operated at a flow rate of 15 kg/hr and under the conditions of 27 mmHg and 100° C to recover water and a small quantity of light oils while the second evaporator was operated with a blade speed of 1,000 r.p.m. under the conditions of 3 mmHg and 290° C, obtaining the pitch from the bottom of the evaporator in a yield calculated on the basis of tall oil of 5.7%. Produced from the top of the evaporator was a yellow oily substance containing 49.4% of rosin acid, 48.4% fatty acid and 2.2% of unsaponifiables (in a yield calculated on the basis of tall oil of 73.1%).

The mixture of these rosin and fatty acids was charged at a flow rate of 1.46 kg/hr into the middle stage of a 25 - 20 stainless steel made distiller having a total packing height of 4.08 m and packed with 15 mm long and 3 inch-inner diameter porcelain bar saddles, said distiller having attached thereto as reboiler a rake-equipped thin film evaporator having a heat transfer area of 0.1 m$^2$ and a clearance of 0.8 mm, and these distiller and evaporator were operated with a blade speed of 1,000 r.p.m. and at a temperature of 280° C, a tower top pressure of 1.5 mmHg and a reflux rate of 8 kg/hr, whereby a yellow oily substance containing 3.4% rosin acid, 94.4% fatty acids and 2.2% unsaponifiables was produced from the top of the distiller at an average flow rate of 710 g/hr while a yellow solid substance containing 93.3% rosin acid, 4.6% fatty acids and 2.1% unsaponifiables was obtained from the bottom of said distiller at an average flow rate of 740 g/hr. No oxy-acid was detected from this solid substance.

For the sake of comparison, a tall oil obtained by decomposing a similar tall oil skimming soap with an aqueous solution of sulfuric acid was treated in the same thin film evaporator as above-said for removing the pitch and then fractionated in the same distiller as used in the above example.

As a result, a pitch was obtained in a yield calculated on the basis of tall oil of 32.1% from the bottom of said thin film evaporator while a red-brownish oily substance was obtained in a yield calculated on the basis of tall oil of 67.5% from the top of the evaporator. This oily substance contained 42.1% of rosin acid, 45.9% of fatty acids and 12.0% of unsaponifiables. This oily substance was then charged into a distiller at a rate of 1.35 kg/hr. With the distiller operated at the reflux rate of 8 kg/hr, said substance was treated under the same conditions as used in Example 1 except that the steam from the upper condenser was condensed by means of 2° C ice water. Consequently, obtained from the top of the distiller as the fatty acid fraction was a brown oily substance containing 3.7% of rosin acid, 77.6% of fatty acids and 18.7% of unsaponifiables at an average flow rate of 750 g/hr, while a liver-colored solid product with 92.5% rosin acid, 5.1% fatty acids and 2.45 unsaponifiables was obtained as the rosin acid fraction from the bottom of the distiller at an average flow rate of 585 g/hr.

A comparison of the yields of the respective fractions obtained in the above-described Example 1 and Referential Example 1 is shown below. (Yield based on tall oil was calculated on the basis of material balance.)

|  | Example 1 | Referential Example 1 |
|---|---|---|
| Light cuts after saponification of tall oil skimming soap | 6.2% | — |
| Heavy cuts | 14.4% | — |
| Pitch in distillation | 5.7% | 32.1% |
| Recovered rosin acid fraction | 37.1% | 29.2% |
| Recovered fatty acid fraction | 35.5% | 37.4% |
| Loss | 1.1% | 1.3% |

Both the rosin acid and fatty acids recovered in Example 1 have a sufficiently high purity for immediate industrial applications, but the fatty acids recovered in Referential Example 1 are of a composition unsatisfactory for industrial use and require additional refining such as rectification. The rates at which rosin acid and fatty acids in the tall oil skimming soap or tall oil can be recovered as useful rosin acid fraction or fatty acid fraction were determined by calculations as follows.

|  | Rosin acid | Fatty acids |
|---|---|---|
| Contents in stock tall oil | 31.2% | 31.2% (calculated as linolic acid) |
| Contents in 100 parts of tall oil | 31.2 | 31.2 |
| Recovery in Example 1 |  |  |
| Rosin acid fraction | 34.6 | 1.7 |
| (recovery in %) | (110.9%) |  |
| Fatty acid fraction | 1.2 | 33.5 |
| (recovery in %) |  | (167.4%) |
| Total | 35.8 | 35.2 |
| Recovery in Referential Example 1 |  |  |
| Rosin acid fraction | 27.0 | 1.5 |
| (recovery in %) | (86.5%) |  |
| Fatty acid fraction | 1.4 | 29.0 |
| (recovery in %) |  | (92.9%) |
| Total | 28.4 | 30.5 |

The fact that the recoveries of the useful rosin acid and fatty acid fractions obtained in Example 1 exceed 100% indicates that the rosin acid and fatty acids bonded in the form of esters in the tall oil skimming soap can be recovered in useful forms.

EXAMPLE 2 AND REFERENTIAL EXAMPLE 2

10 Kg of the tall oil skimming soap collected from a kraft pulp plant different from that in Example 1 was acid-decomposed with a 5% sulfuric acid solution in the same manner as in Example 1 to obtain 4.84 kg of a dark brown oily substance (tall oil). This tall oil had a total acid value of 135.0 and a saponification value of 154.6 and contained 36.5% of rosin acid, 2.5% of oxy-acids and 20.1% of unsaponifiables.

This tall oil skimming soap was charged into a thin film evaporator having a heat transfer area of 0.1 m² and no clearance between the blade tips and the interior wall of the vessel at a flow rate of 10 kg/hr according to the method shown in FIG. 3, and treated therein with a blade speed of 1,000 r.p.m. and under the conditions of 235° C and 17 mmHg. Light unsaponifiables were distilled off with water from the top of the evaporator, so after condensing this product with ice-cooled water, the water content was removed to obtain a yellowish brown oily substance in a yield calculated on the basis of tall oil of 3.2%. The soaps obtained from the bottom of the evaporator could be solidified upon cooling and easily powdered. These soaps were dark brown and had no foul smell which the tall oil skimming soap and tall oil had.

To 20 kg of these soaps was added 4.2 kg of a 5% sodium hydroxide solution, and the mixture was saponified in an agitator-equipped 50-liter autoclave under the conditions of 185° C and 11 kg/cm² for 50 minutes. The saponified product was neutralized with a 5% sulfuric acid solution, and sulfuric acid was further added in an excess of 5%. The mixture was agitated at 80° to 95° C for 1 hour, allowed to stand, and then separated into the oil and water phases, with the oil phase being withdrawn by centrifugal separation. The obtained dark-brown oily substance was supplied at a flow rate of 15 kg/hr into two series-connected thin film evaporators having a heat transfer area of 0.1 m² and a clearance of 0.8 mm (same as used in Example 1), with the first evaporator being operated under the conditions of 25 mmHg and 100° C to remove mostly water, while the second evaporator was operated under the conditions of 3 mmHg, 270° C and a blade speed of 1,000 r.p.m. to evaporate the oil content, obtaining a dark-colored pitch from the bottom of the evaporator in a yield calculated on the basis of tall oil of 18.6%. The oily substance obtained from the top of the second evaporator was yellow, and this was charged into the same vacuum distillation tower as used in Example 1 at a flow rate of 1.5 kg/hr, the distillation tower being operated at a tower top pressure of 1.5 mmHg and a reflux rate of 8 kg/hr, obtaining a citrine fatty acid fraction containing 93.6% fatty acids, 4.7% rosin acid and 1.7% unsaponifiables from the tower top in a yield calculated on the basis of tall oil of 35.8%. Obtained from the tower bottom in a yield calculated on the basis of tall oil of 41.7% was a yellow rosin acid fraction containing 93.3% rosin acid, 4.8% fatty acids, 1.9% unsaponifiables and 0% esters.

By way of comparison, a tall oil obtained from a similar tall oil skimming soap was distilled in the same way as in Example 1 to obtain as fatty acid fraction a fulvous oily substance containing 83.8% fatty acids, 3.4% rosin acid and 12.8% unsaponifiables. There was also obtained as rosin acid fraction a similar yellowish brown substance containing 92.9% rosin acid, 5.1% fatty acids and 2.0% unsaponifiables.

The yields based on tall oil were calculated from the material balances of the respective fractions obtained in the foregoing Example 2 and Referential Example 2, obtaining the following results.

|  | Example 2 | Referential Example 2 |
|---|---|---|
| Light cuts of tall oil skimming soap | 3.2% | — |
| Pitch in distillation | 18.6% | 28.7% |
| Recovered rosin acid | 41.7% | 35.4% |
| Recovered fatty acids | 35.8% | 35.1% |

-continued

|  | Example 2 | Referential Example 2 |
|---|---|---|
| Loss | 0.7% | 0.8% |

Comparing the properties of the products obtained in the respective examples, it is noted that the rosin acids recovered in both examples have purities high enough for industrial uses, but those obtained in Example 2 are lighter in color. As for the recovered fatty acid fraction, the fatty acids obtained in Example 2 were excellent in both purity and color and considered to be immediately applicable to industrial uses and were also substantially free of the offensive smell possessed by the tall oil fatty acids. On the other hand, the fatty acids obtained in Referential Example 2 are too low in purity for industrial uses and require additional rectification. Since many unsaponifiables are removed by such rectification, the portion of fatty acids lost in company with such unsaponifiables cannot be ignored. Such fatty acids are also bad in color shade and have strong foul smell peculiar to tall oil. The rates at which rosin acid and fatty acids contained in the stock tall oil skimming soap and tall oil were recovered in useful forms were determined from the respective yields and compositions, obtaining the following results.

|  | Rosin acid | Fatty acids |
|---|---|---|
| Contents in stock tall oil | 36.5% | 31.2% (calculated as linolic acid) |
| Contents in 100 parts of tall oil | 36.5 | 31.2 |
| Recovery in Example 2 |  |  |
| Rosin acid fraction | 38.9 | 2.0 |
| (recovery in %) | (106.6%) |  |
| Fatty acid fraction | 1.7 | 33.5 |
| (recovery in %) |  | (107.4%) |
| (Total) | (40.6) | (35.5) |
| Recovery in Referential Example 2 |  |  |
| Rosin acid fraction | 32.9 | 1.8 |
| (recovery in %) | (90.1%) |  |
| Fatty acids fraction | 1.2 | 29.4 |
| (recovery in %) |  | (94.2%) |
| (Total) | (34.1) | (31.2) |

The fact that the effective yields of rosin acid and fatty acids in Example 2 exceed 100% indicates that the rosin acid and fatty acids ester-bonded in the tall oil skimming soap can be recovered in useful forms according to the process of this invention. Also the soaps obtained by distilling off water and light unsaponifiables EXAMPLE the tall oil skimming soap can be easily formed into solids or powder for easy treatment, and therefore it is considered that they have little hygroscopicity and are very easy to transport.

EXAMPEL 3 AND REFERENTIAL EXAMPLE 3

20 Kg of a tall oil having a total acid value of 145.0 and a saponification value of 158.0 and containing 38.0% rosin acid, 18.3% unsaponifiables and 35.2% fatty acids (calculated as linolic acid) was neutralized with a 5% sodium hydroxide solution in a 50-liter autoclave equipped with an agitator, and a 5% alkali solution was further added in excess and the mixture was saponified under the conditions of 12.0 kg/cm$^2$ and 193° C for 30 minutes. The saponified mixture was then fed at a flow rate of 15 kg/hr into a thin film evaporator having a heat transfer area of 0.1 m$^2$ and no clearance between the blade tips and tube wall, and treated therein under the conditions of 210° C, 18 mmHg and 1,000 r.p.m. blade speed. Water and light unsaponifiables were removed from the top of the evaporator, and water was separated from this mixture to obtain a brown oily substance with a terpene-like smell in a yield of 5.2%. the soaps obtained from the bottom of the evaporator were poured into 5% aqueous solution of sulfuric acid at 80° to 90° C for neutralization, then sulfuric acid was added in an excess of 2 to 3%. The mixture was allowed to stand for a while, and separated into the oil and water phases, with the oil phase being removed by centrifugal separation. The yield of the oil phase from tall oil was 94.3%.

This oil phase was then subjected to distillation after pitch removal in the same two-stage thin film evaporator as used in Examples 1 and 2, obtaining the pitch in a yield of 13.9% from the tall oil. Recovered from the distillation tower bottom as the rosin acid fraction in a yield of 41.8% was a yellow solid substance containing 93.5% rosin acid, 4.5% fatty acids and 2.0% unsaponifiables, while a light-yellow fatty acid fraction with 94.4% fatty acids. 3.4% rosin acid and 2.2% unsaponifiables was recovered from the tower top in a yield of 38.1%.

For the sake of comparison, the tall oil same as used in the just described Example 3 was immediately subject to distillation after pitch removal in the same two-state thin film evaporator without undergoing saponification and cutting of the light components. The pitch was obtained in a yield of 21.2% from the tall oil. From the bottom of the distillation tower, there was obtained a yellow solid substance containing 93.0% rosin acid, 4.8% fatty acids and 2.2% unsaponifiables as the rosin acid fraction at the yield of 37.3%, while a brownish oily substance containing 81.2% fatty acids, 3.7% rosin acids and 15.1% unsaponifiables was obtained as the fatty acid fraction from the tower top at the yield of 40.4%.

The obtained crude fatty acids were then introduced into the same distillation tower at a flow rate of 1.5 kg/hr and treated therein at a tower top pressure of 7 mmHg and a reflux rate of 19 kg/hr, separating the light fraction in a yield calculated on the basis of tall oil of 10.5% from the tower top. This light fraction was a red-brownish liquid containing 49.5% of unsaponifiables and 50.5% of fatty acids. The fatty acid fraction yielded from the tower bottom was further charged into the same distillation tower at a flow rate of 1.5 kg/hr and the rectification was repeated therein at reflux rate of 8 kg/hr and a tower top pressure of 1.7 mmHg, consequently obtaining from the tower top a light-yellow oily product with 96.8% fatty acids, 1.2% rosin acid and 2.0% unsaponifiables in a yield calculated on the basis of tall oil of 25.0%, and from the tower bottom a brown oily substance containing 70.5% fatty acids, 27.3% rosin acid and 2.2% unsaponifiables in a yield calculated on the basis of tall oil of 4.4%.

A comparison of the yields in the foregoing Example 3 and Referential Example 3 is given below.

|  | Example 3 | Referential Example 3 |
|---|---|---|
| Light fraction after saponification of tall oil | 5.2% | — |
| Cuts in distillation | 13.9% | 21.2% |
| Recovered rosin acid fraction | 41.8% | 37.3% |
| Recovered fatty acid fraction | 38.1% | 40.4% |

-continued

|  | Example 3 | Referential Example 3 |
|---|---|---|
| Loss | 1.0% | 1.1% |
| After rectification of the recovered fatty acid fraction in Referential Example 3: | | |
| Pure fatty acid fraction | — | 25.0% |
| Fatty and rosin acid mixture | — | 4.4% |
| Head | — | 10.5% |
| Loss | — | 0.5% |

Given in the following are the results of calculations of the recovery percentages at which the rosin acid and fatty acids in the stock tall oil are recovered in the form of useful fractions.

|  | Rosin acid | Fatty acids |
|---|---|---|
| Contents in stock tall oil | 38.0% | 35.2% (calculated as linolic acid) |
| Contents in 100 parts of tall oil | 38.0 | 35.2 |
| Recoveries in Example 3 | | |
| Rosin acid fraction (recovery in %) | 39.1 (102.9%) | 1.9 |
| Fatty acid fraction (recovery in %) | 1.3 | 36.0 (102.3%) |
| (Total) | (40.4) | (37.9) |
| Recoveries in Referential Example 3 | | |
| Rosin acid fraction (recovery in %) | 34.7 (91.3%) | 1.8 |
| Fatty acid fraction (recovery in %) | 1.5 | 32.8 (93.2%) |
| (Total) | (36.2) | (34.6) |
| After re-rectification: | | |
| Rectified fatty acid fraction (recovery in %) | 0.3 | 24.2 (68.8%) |
| Rosin-fatty acid fraction (recovery in %) | 1.2 (3.2%) | 3.1 (8.8%) |
| (Total) | (1.5) | (27.3) |

The fact that the recoveries of rosin acid and fatty acids in the form of useful fractions in Example 3 indicates that rosin acid and fatty acids bonded in ester type in tall oil were recovered in useful forms. The thus recovered fatty acid fraction contains only a few percentage of unsaponifiables and can therefore be well applied for industrial uses, whereas the fatty acid fraction obtained in Referential Example 3 contains a high percentage of unsaponifiables and hence is unsuited for industrial applications in the form as obtained. But, if it is subjected to rerectification for removing the unsaponifiables, a considerable amount of fatty acids are inevitably lost together with the light unsaponifiables, resulting in excessively reduced recovery of the useful refined fatty acid fraction.

These results indicate excellent adaptability of the present invention to recovery of rosin acid and fatty acids from tall oils. The process of this invention is also capable of markedly enhancing the yields of rosin acid and fatty acids by mere incorporation of a saponifier, light cut evaporator(s) and acid decomposer in the conventional tall oil distillation equipment and can also simplify or dispense with the fatty acid rectifying step, thus allowing curtailment of the required utilities, improvement of the throughput capacity of the apparatus, alleviation of the pollution problem owing to limited by-products, and improvement of the product quality.

EXAMPLE 4

800 Grams of the heavy unsaponifiables after saponification of the tall oil skimming soap obtained in Example 1 was dissolved in hot isopropyl alcohol containing 10% of water, followed by addition of 100 gr of phosphoric acid and 15 gr of diatomaceous earth, and after the treatment, diatomaceous earth was filtered off under heat and the filtrate was cooled to obtain yellow needle-like crystals. These crystals were recrystallized twice from hot isopropyl alcohol to obtain 140 g of white needle-like crystals. These crystals had a melting point of 137.1° C and a sterol analysis by digitonin showed 98% sitosterol purity.

EXAMPLE 5 AND REFERENTIAL EXAMPLE 4

To 20 kg of the same tall oil skimming soap specimen (with an acid value of 125 calculated as tall oil, a saponification value of 144.6, 31.2% rosin acid, 2.5% oxy-acids and 25.3% unsaponifiables) as used in Example 1 were added 4.6 kg of a 5% sodium hydroxide solution and 15 gr of 2,2′-thiobis (4-methyl-6-tertiary-butyl-phenol), and the mixture was saponified in a 50-liter autoclave under the conditions of 185° C and 10.5 kg/cm$^2$ for 50 minutes. The resultant saponified product was treated in the same way as used in Example 1, and the abietic acid content and color of the obtained rosin acid were determined. By way of comparison, a similar determination was made on the rosin acid obtained in Example 1.

|  | Rosin acid in Example 5 | Rosin acid from Example 1 (for comparison) |
|---|---|---|
| Abietic acid (%) | 1.2 | 31.4 |
| Color | X - 3A | WW |

EXAMPLE 6 AND REFERENTIAL EXAMPLE 5

For comparing the fatty acid recoveries in Example 1 and Referential Example 1, the conjugated and non-conjugated fatty acid (linolic acid) contents in the respective products were determined.

|  |  | Fatty acids in Example 1 | Fatty acids in Referential Example 1 |
|---|---|---|---|
| Linolic acid content | Non-conjugated (%) | 12.8 | 39.0 |
|  | Conjugated (%) | 30.0 | 4.0 |

What is claimed is:

1. A process for recovering isomerized fatty acids and/or rosin acid in high purity, comprising: introducing a tall oil skimming soap or a tall oil soap into a thin film evaporator equipped with a rake in which the clearance between the blade tips and the surrounding tube wall is zero or not more than 1 mm; heating the contents of said thin film evaporator at a temperature higher than the melting point of the soap contained therein to evaporate and remove water and low-boiling unsaponifiable matter; adding an alkali to the thus obtained crude soap in an amount of 1.2 to 3.5 times the amount required to saponify the saponifiables in said tall oil skimming soap or tall oil soap at 120° to 210° C over a period of 20 minutes to 3 hours, thereby simultaneously decomposing esters of rosin acid and fatty acids with sterols and other alcohols and isomerizing non-conjugated double bond containing fatty acids to conjugated fatty acids; and then subjecting the saponification product to acid decomposition and then to distillation to obtain the desired isomerized fatty acids and/or rosin acid.

2. A process for recovering not only high purity fatty acids and/or rosin acid but also sterols according to claim 1, wherein the saponification product, prior to acid decomposition, is introduced into a thin film evaporator equipped with a rake in which the clearance between the blade tips and the surrounding tube wall is zero or not more than 1 mm, and heated therein to a temperature higher than the melting point of the soap contained therein, thereby evaporating and separating sterols and heavy unsaponifiables.

3. A process for recovering isomerized fatty acids and/or rosin acid in high purity, comprising: saponifying a tall oil skimming soap or a tall oil soap with an alkali in an amount of 1.2 to 3.5 times the amount required to saponify the saponifiables in said tall oil skimming soap or tall oil soap at 120° C to 210° C over a period of 20 minutes to 3 hours, thereby simultaneously decomposing esters of rosin acid and fatty acids with sterols and other alcohols and isomerizing non-conjugated double bond containing fatty acids to conjugated fatty acids; introducing the saponification product into a thin film evaporator equipped with a rake in which the clearance between the blade tips and the surrounding tube wall is zero or not more than 1 mm; heating the contents of said thin film evaporators at a temperature higher than the melting point of the soap contained therein to evaporate and remove water and low-boiling unsaponifiables; and subjecting the thus obtained saponification product to acid decomposition and then to distillation, thereby obtaining the desired isomerized fatty acids and/or rosin acid.

4. A process according to claim 3, wherein the saponification product after the removal of water and unsaponifiables is introduced, prior to acid decomposition, into a thin film evaporator equipped with a rake in which the clearance between the blade tips and the surrounding tube wall is zero or not more than 1 mm to evaporate and separate sterols and heavy unsaponifiables.

5. A process according to claim 1, wherein the treatment of a tall oil skimming soap or a tall oil soap is effected in the presence of a disproportionating catalyst, thereby obtaining a disproportionated rosin acid as a distillate.

6. A process according to claim 5, wherein the disproportionating catalyst is an alkylphenol type thiobis compound.

7. A process according to claim 5, wherein the disporportionation reaction is effected at 150° C or higher with stirring for a period of 20 min. to 1 hour.

* * * * *